Oct. 21, 1952  R. A. PETERS  2,614,333
BRAKE SHOE GAUGE
Filed April 24, 1950

Rudolph A. Peters
INVENTOR.

BY *Clarence A. O'Brien*
*and Harvey B. Jacobson*
Attorneys

Patented Oct. 21, 1952

2,614,333

UNITED STATES PATENT OFFICE 2,614,333

BRAKE SHOE GAUGE

Rudolph A. Peters, San Antonio, Tex.

Application April 24, 1950, Serial No. 157,709

1 Claim. (Cl. 33—180)

This invention relates to a device for aiding in the adjustment of brake shoes for automotive vehicles and more particularly to a gauge for adjusting internal expanding brake shoes centrally and for proper clearance thereof.

An object of this invention is to provide a brake shoe gauge which indicate twisted or bent brake shoes and determine the concentricity and clearance of the shoe to the drum in a relatively easy and simple manner.

A further object of this invention is to provide a very simple device eliminating the necessity of micrometers and the like for enabling a mechanic to adjust brake shoes in their relation to the brake shoe drum they are to contact when actuated.

Still further objects of the invention reside in the provision of a brake shoe gauge that is strong, durable, highly efficient in operation, simple in construction and manufacture, capable of being readily and easily used even by an inexperienced mechanic, and which is relatively inexpensive.

These, together with the various ancillary objects of the invention which will become apparent as the following description proceeds, are attained by this brake shoe gauge, a preferred embodiment of which has been illustrated in the accompanying drawings, by way of example only, wherein.

Figure 1:
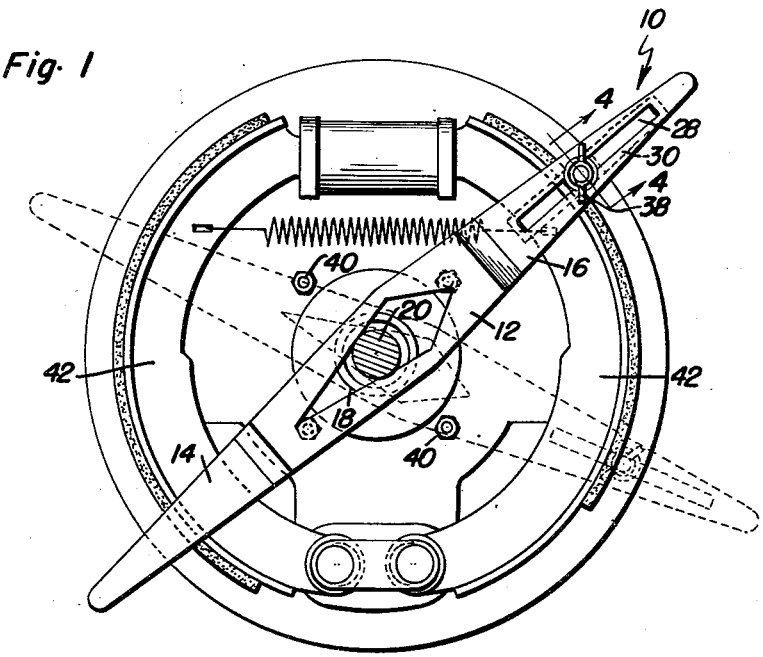
Figure 1 is a vertical sectional view showing the brake shoe gauge in operative emplacement about a conical spindle of an axle of an automotive vehicle.
Figure 2:
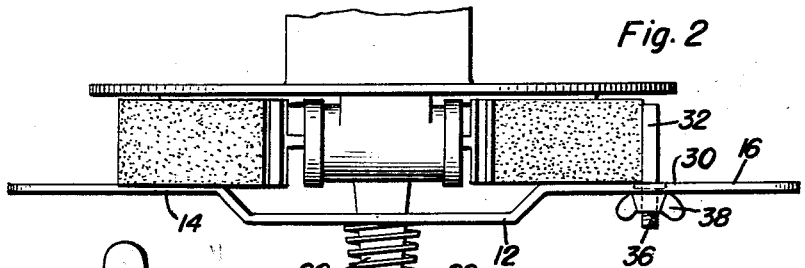
Figure 2 is a top plan view showing the invention in operative emplacement on the automotive vehicle's axle.
Figure 3:
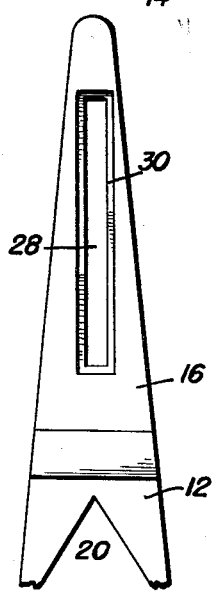
Figure 3 is an enlarged elevational view of the portion of the brake shoe gauge having adjustable guide means for supporting the gauge pin.
Figure 5:
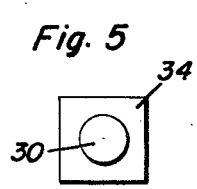
Figure 5 is a rear elevational view of the slidably mounted gauge pin and guide flange secured on the gauge pin.
Figure 4:
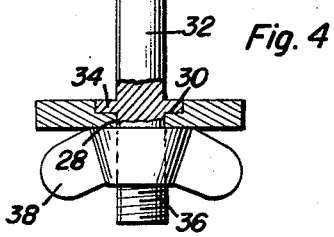
Figure 4 is a sectional detail as taken along line 4—4 in Figure 1.

With continuing reference to the accompanying drawings, wherein like reference numerals designate similar parts throughout the various views, reference numeral 10 generally indicates the brake shoe gauge which is provided with a central offset portion 12 and two end portions 14 and 16. The central portion 12 is provided with a substantially diamond shape aperture 18 therethrough for centering of the gauge upon the conical spindle 20 of the axle of an automotive vehicle.

A conical coil spring 22 concentric with the conical spindle 20 is positioned in abutting relationship with the central portion 12 and is held in place by a washer 25 and a nut 26 threadedly engaged on the spindle 20.

A slot 28 is formed in the end portion 16 and a recess 30 is formed in the end portion adjacent and about the periphery of the slot 28. Adjustably slidably engaged within the slot 28 is a gauge pin 32 having a flange 34 thereon slidably engaged in the recess 30. The pin 32 is threaded, as at 36, and a wing nut 38 is provided to adjustably secure the gauge pin 32 in a predetermined position.

To operate this brake shoe gauge, it is merely necessary to jack the automotive vehicle until the wheel having the axle thereon with the brake shoes operatively emplaced is clear of the ground. It is necessary to turn each brake shoe adjusting cam 40 until the lining of the companion brake shoes 42 contact the brake drum. Then the brake shoe adjusting cams are backed off adjustment slightly so that the lining of the brake shoes just clear the drum. By turning the drum one or two revolutions to determine freeness all the way around, the brake shoes can be adjusted for test. The gauge is placed upon the spindle of the vehicle axle. The coil spring 22 is next placed over the spindle and the washer 24 and nut 26 applied to the spindle to form an abutment for the spring which will engage the offset portion 12 to urge the ends 14 and 16 of the gauge to rest firmly on the brake shoe edges and the gauge pin 32 is on the outside of the brake shoe and lining. The gauge is positioned so that the end of the guide slot is about one and one-half inches from the end of the brake shoe toe. The gauge pin is firmly positioned against the brake shoe lining and locked in place. Then, by moving the gauge adjusting pin downward toward the heel of the shoe, any eccentricity in the brake shoe may be noted and readily adjusted for. Then, it is merely necessary to revolve the gauge pin around the shoe to determine the concentricity thereof. If the anchors of the brake shoes are too far off adjustment, it may be necessary to reset the toes of the shoes. Hence, the brake shoe adjusting cams 40 are re-set. However, it is believed that any warping or other eccentricity in the brake shoes may be readily determined and this may be adjusted by using the present invention.

Since, from the foregoing, the construction and advantages of this brake shoe gauge are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

Having described the invention, what is claimed as new is:

A brake shoe gauge consisting of an elongated rigid member for engaging diametrically across a pair of companion brake shoes; said member having a central portion which is provided with a substantially diamond-shaped aperture for centering the member about the wheel spindle of a car axle; said central portion being offset axially outwardly with respect to the oppositely extending integral end portions of said member; a coil spring adapted to fit over the outer end of the axle spindle and engage said outwardly offset central portion and urge the ends of the member against the brake shoes; said spring also yieldingly engaging said offset portion to restrict radial movement of the member relative to the spindle; and guide means comprising a slot in one of said end portions of said member and disposed longitudinally of said member, said one of said end portions having a recess adjacent and along the edges defining the slot, a gauge pin having an integral flange thereon slidably seated in said recess, and locking means on said gauge pin engageable with the member to retain the pin adjusted longitudinally in said slot.

RUDOLPH A. PETERS.

REFERENCES CITED

The following references are of record in the file of this patent:

UNITED STATES PATENTS

| Number | Name | Date |
|---|---|---|
| 842,205 | Kelly | Jan. 29, 1907 |
| 1,346,409 | Lucas | July 13, 1920 |
| 2,341,796 | Kuna et al. | Feb. 15, 1944 |
| 2,426,991 | Emrich | Sept. 9, 1947 |

FOREIGN PATENTS

| Number | Country | Date |
|---|---|---|
| 587,609 | Germany | Nov. 6, 1933 |

OTHER REFERENCES

Publ.: "Automotive Trade Journal," June 1933, pg. 57, "Lockwood Brake Gage."